United States Patent
Kong et al.

(10) Patent No.: US 9,005,791 B2
(45) Date of Patent: Apr. 14, 2015

(54) ROTARY JIG OF BATTERY CELL AND PROCESS OF WELDING FOR BATTERY CELL USING THE SAME

(75) Inventors: Jeong-Pyo Kong, Chungcheongbuk-do (KR); Chunyeon Kim, Chungcheongbuk-do (KR); Tae-Wook Kim, Chungcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 235 days.

(21) Appl. No.: 13/807,620

(22) PCT Filed: Jul. 15, 2011

(86) PCT No.: PCT/KR2011/005190
§ 371 (c)(1),
(2), (4) Date: Mar. 13, 2013

(87) PCT Pub. No.: WO2012/008775
PCT Pub. Date: Jan. 19, 2012

(65) Prior Publication Data
US 2013/0164590 A1    Jun. 27, 2013

(30) Foreign Application Priority Data
Jul. 16, 2010 (KR) ......................... 10-2010-0068951

(51) Int. Cl.
*H01M 2/10* (2006.01)
*B23Q 3/152* (2006.01)
(Continued)

(52) U.S. Cl.
CPC ................ *H01M 2/00* (2013.01); *B23K 37/04* (2013.01); *B23K 37/0435* (2013.01);
(Continued)

(58) Field of Classification Search
USPC ................... 429/163–187, 149–160, 96–100; 29/623.1–623.5
See application file for complete search history.

(56) References Cited

U.S. PATENT DOCUMENTS 4,542,278 A * 9/1985 Taylor ....................... 219/121.79
6,492,058 B1 * 12/2002 Watanabe et al. ............. 429/121

FOREIGN PATENT DOCUMENTS

JP      10-43866 A    2/1998
JP    2001-160383 A   6/2001
(Continued)

OTHER PUBLICATIONS
Machine Translation of Ikeda et al. (JP 2001-160383, published Jun. 2001, pp. 1-10).*
(Continued)

*Primary Examiner* — Basia Ridley
*Assistant Examiner* — Caitlin Wilmot
(74) *Attorney, Agent, or Firm* — Birch, Stewart, Kolasch & Birch, LLP

(57) ABSTRACT

Disclosed herein is a rotary jig for battery cells to successively manufacture battery cells having different sizes including a main body configured to have a hexahedral structure having a rotary rod mounted at a lower end thereof, the main body being provided at sides thereof with mounting frames having sizes corresponding to sizes of battery cells so that the battery cells can be uprightly mounted in the mounting frames in a state in which electrode terminals of the battery cells are exposed upward, a die disposed at a lower end of the main body, the die connected to the rotary rod so that the die can be rotated manually or by a rotary motor, and support members formed at the die to support the mounting frames of the main body and the battery cells mounted in the mounting frames, wherein the rotary rod is rotated so that resistance welding is performed with respect to a portion of one of battery cells to be welded using a welding rod located above the battery cell in a state in which the battery cells are mounted to the corresponding sides of the main body.

10 Claims, 5 Drawing Sheets

(51) Int. Cl.
*H01M 2/00* (2006.01)
*B23K 37/04* (2006.01)
*B23Q 3/06* (2006.01)
*B23Q 7/04* (2006.01)
*B23K 11/00* (2006.01)
*B23K 11/11* (2006.01)
*B23K 26/20* (2014.01)
*H01M 2/04* (2006.01)

(52) U.S. Cl.
CPC ........... *B23Q 3/061* (2013.01); *B23K 37/0452* (2013.01); *H01M 2/10* (2013.01); *B23Q 3/152* (2013.01); *B23Q 7/048* (2013.01); *B23K 11/002* (2013.01); *B23K 11/11* (2013.01); *B23K 26/20* (2013.01); *B23K 37/0443* (2013.01); *H01M 2/0426* (2013.01); *H01M 2200/105* (2013.01)

(56) References Cited

FOREIGN PATENT DOCUMENTS

| | | |
|---|---|---|
| JP | 2005-267878 A | 9/2005 |
| KR | 10-0389968 B1 | 7/2003 |
| KR | 10-0749477 B1 | 8/2007 |
| KR | 10-2008-0037441 A | 4/2008 |
| WO | WO 03/010848 A1 | 2/2003 |
| WO | WO 2005/029611 A1 | 3/2005 |

OTHER PUBLICATIONS

Machine Translation of Byun (KR 10-2008-0037441, published Apr. 2008, pp. 1-11).*
International Search Report issued in PCT/KR2011/005190, mailed on Feb. 21, 2012.

* cited by examiner

ROTARY JIG OF BATTERY CELL AND PROCESS OF WELDING FOR BATTERY CELL USING THE SAME

TECHNICAL FIELD

The present invention relates to a rotary jig for battery cells to successively manufacture battery cells having different sizes including a main body configured to have a hexahedral structure having a rotary rod mounted at a lower end thereof, the main body being provided at sides thereof with mounting frames having sizes corresponding to sizes of battery cells so that the battery cells can be uprightly mounted in the mounting frames in a state in which electrode terminals of the battery cells are exposed upward, a die disposed at a lower end of the main body, the die connected to the rotary rod so that the die can be rotated manually or by a rotary motor, and support members formed at the die to support the mounting frames of the main body and the battery cells mounted in the mounting frames, wherein the rotary rod is rotated so that resistance welding is performed with respect to a portion of one of battery cells to be welded using a welding rod located above the battery cell in a state in which the battery cells are mounted to the corresponding sides of the main body.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

However, various kinds of combustible materials are contained in the lithium secondary battery. As a result, the lithium secondary battery may be heated or explode due to the overcharge of the battery, the overcurrent in the battery, or external physical impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are mounted to a battery cell in a state in which the safety elements are connected to the battery cell.

Generally, the PCM is connected to the battery cell via conductive nickel plates by welding. That is, the nickel plates are connected to electrode tabs of the PCM by welding, and then the nickel plates are connected to electrode terminals of the battery cell by welding. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell.

Meanwhile, an operation of coupling components, including a protection circuit member such as a PCM, to the upper end of a battery cell is performed on a battery pack assembly line. The construction of such an assembly line may be changed as needed. Generally, the assembly line is configured such that a metal clad, an insulative mounting member, a protection circuit module, and an insulative top cap may be sequentially coupled to the upper end of the battery cell.

In a case in which different kinds of battery cells are assembled, however, different assembly lines must be configured based on the kinds and sizes of the battery cells with the result that manufacturing cost is increased. Furthermore, assembly time is increased, and therefore, assembly efficiency is lowered.

In order to solve the above problems, therefore, there is a high necessity for a technology that is capable of assembling battery cells having different sizes on a single assembly line, thereby improving manufacturing efficiency and productivity of a battery pack.

DISCLOSURE

Technical Problem

Therefore, the present invention has been made to solve the above problems, and other technical problems that have yet to be resolved.

Specifically, it is an object of the present invention to provide a rotary jig for battery cells to successively weld battery cells having different sizes and a battery pack welding method using the same.

Technical Solution

In accordance with one aspect of the present invention, the above and other objects can be accomplished by the provision of a rotary jig for battery cells to successively manufacture battery cells having different sizes including a main body configured to have a hexahedral structure having a rotary rod mounted at a lower end thereof, the main body being provided at sides thereof with mounting frames having sizes corresponding to sizes of battery cells so that the battery cells can be uprightly mounted in the mounting frames in a state in which electrode terminals of the battery cells are exposed upward, a die disposed at a lower end of the main body, the die connected to the rotary rod so that the die can be rotated manually or by a rotary motor, and support members formed at the die to support the mounting frames of the main body and the battery cells mounted in the mounting frames, wherein the rotary rod is rotated so that resistance welding is performed with respect to a portion of one of battery cells to be welded using a welding rod located above the battery cell in a state in which the battery cells are mounted to the corresponding sides of the main body.

Consequently, the rotary jig for battery cells according to the present invention solves the conventional problems in that various kinds of jigs must be configured based on sizes of battery cells during manufacturing a battery pack, thereby reducing process time and greatly reducing manufacturing cost of the battery cells.

The mounting frames and the support members have different sizes at four sides of the main body so that battery cells having different sizes can be mounted in the respective mounting frames. Consequently, four kinds of battery cells can be assembled on a single process line, thereby improving assembly efficiency.

In a preferred example, the mounting frames may have sizes corresponding to widths of the battery cells, and the support members may be configured such that the upper end of a battery cell case of each of the battery cells is spaced apart from the upper end of each of the mounting frames by a predetermined height in a state in which the battery cells are mounted in the respective mounting frames.

That is, the support members may have different heights as long as the distance between the welding rod and a portion of each battery cell to be welded at each side of the main body is uniform.

Each of the mounting frames may have a size corresponding to 30% to 50% the width of the main body. If the size of each of the mounting frames is too small, the size of the main body is relatively large with the result that a work space may be increased. On the other hand, if the size of each of the mounting frames is too large, the size of the main body is relatively small with the result that work efficiency may be lowered.

Meanwhile, the support members may be configured so as to be inserted into lower end openings of the respective mounting frames. Consequently, it is possible to easily adjust the height of each of the support members based on the height of a corresponding one of the battery cells.

In another preferred example, the rotary rod may be moved upward above the height of a corresponding one of the supporting members and may be then rotated by 90 degrees for successive welding with respect to to-be-welded portions of the battery cells uprightly mounted to the respective sides of the main body.

Also, the rotary rod may be moved automatically, semi-automatically, or manually for successive welding. The moving mode may be selectively set as needed.

Meanwhile, the welded portion may be one selected from among a metal clad, a nickel plate, and a positive temperature coefficient (PTC) element electrically connected to a top of a corresponding one of the battery cells using resistance welding.

The welded portion is not particularly restricted so long as welding is performed with respect to each battery cell. The welded portion may be formed through various kinds of operations. Welding may be one selected from among various operations to couple components to the upper part of each battery cell.

Meanwhile, the battery cells are not particularly restricted so long as the electrode terminals of each of the battery cells are exposed upward. For example, the battery cells may be plate-shaped secondary batteries, each of which has an anode terminal and a cathode terminal formed at the top thereof. Examples of a plate-shaped secondary battery may include a prismatic battery and a pouch-shaped battery.

In accordance with another aspect of the present invention, there is provided a welding method of electrically connecting upper parts of battery cells using the rotary jig for battery cells in succession.

Specifically, the welding method includes (a) mounting the battery cells in mounting frames of a main body, (b) a step of performing resistance welding with respect to a portion of one of the battery cells to be welded at one side of the main body, (c) moving the main body upward above a corresponding one of the supporting members, rotating the main body by 90 degrees, moving the main body downward using the rotary rod, and fixing the main body, and (d) repeating step (b) and step (c).

According to the welding method, it is possible to perform resistance welding with respect to to-be-welded portions of battery cells having different sizes mounted to the respective sides of the main body through the rotation of the rotary rod, and therefore, it is possible to successively perform the welding process. In addition, it is not necessary to configure various kinds of jigs based on sizes of the battery cells, thereby greatly reducing process time and manufacturing cost of the battery cells.

In accordance with a further aspect of the present invention, there is provided a battery pack manufactured using the above-stated method.

Nickel plates may be connected to electrode tabs of a protection circuit module (PCM) by welding, and then the nickel plates may be connected to electrode terminals of a battery cell by welding. In this way, the PCM may be connected to the battery cell to manufacture a battery pack. However, partial modification is also possible.

Advantageous Effects

As is apparent from the above description, a rotary jig for battery cells according to the present invention, including a main body configured to correspond to sizes of battery cells, a die having a rotary rod, and support members to support the battery cells, performs welding with respect to portions of the battery cells to be welded while rotating the main body to manufacture battery cells having different sizes on a single assembly line, thereby improving manufacturing efficiency and productivity of a battery pack.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
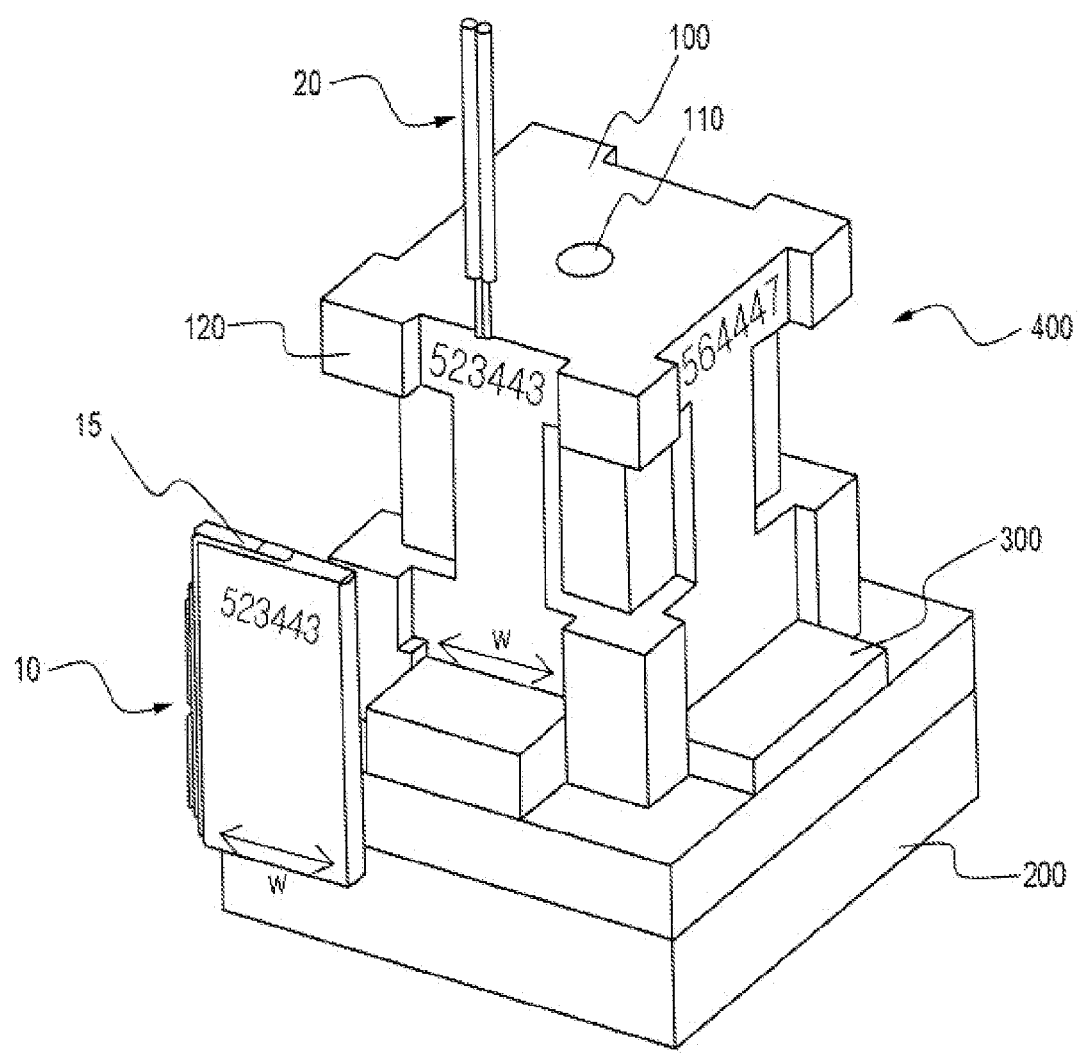
FIGS. 1 to 2 are typical views showing a process of mounting battery cells to a rotary jig for battery cells.
Figure 2:
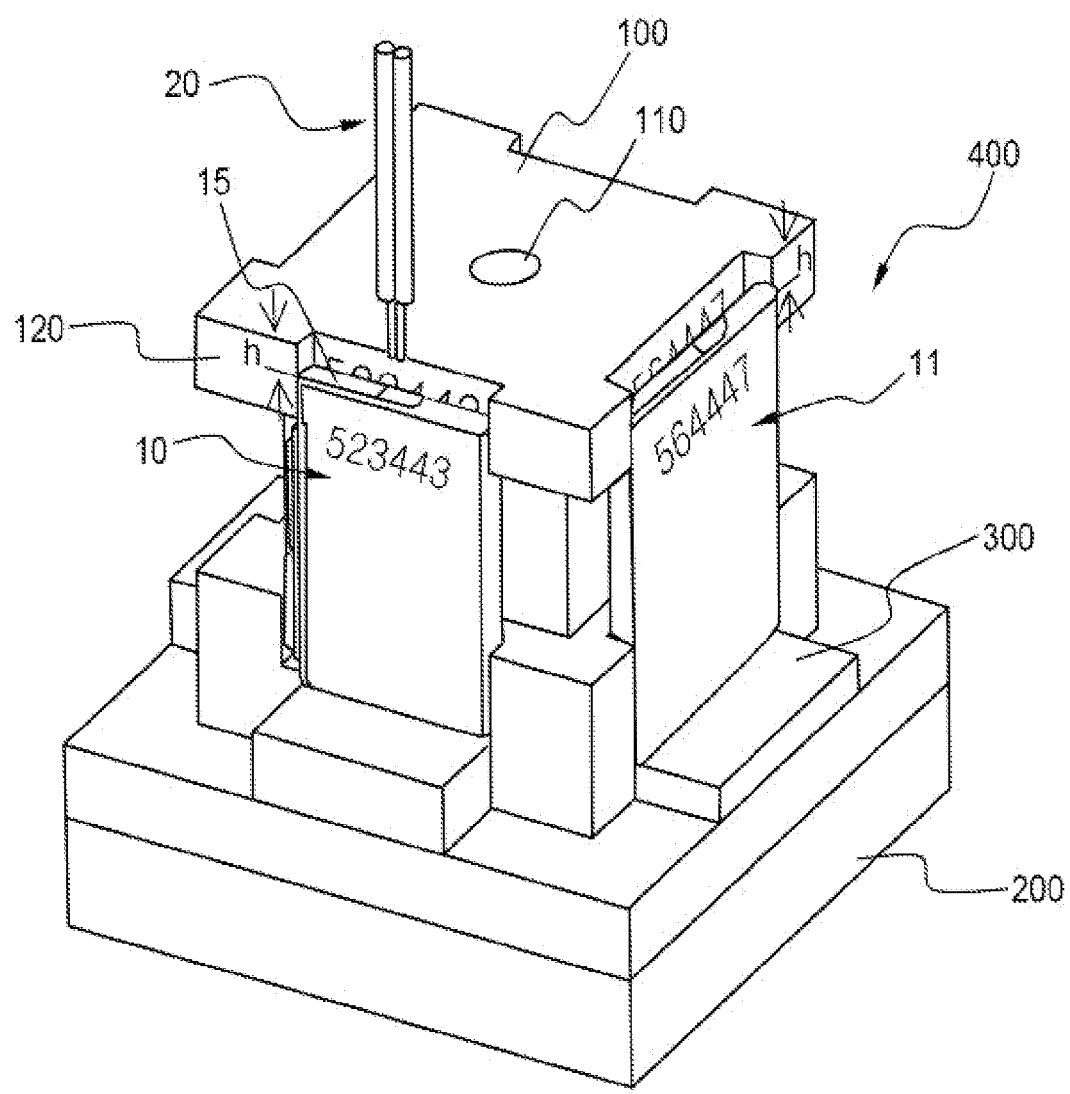

FIGS. 1 to 2 are typical views showing a process of mounting battery cells to a rotary jig for battery cells.

Referring to these drawings, a rotary jig 400 for battery cells includes a main body 100, a die 200, and support members 300.

The main body 100 is generally configured to have a hexahedral structure having a rotary rod 110 mounted at the lower end thereof. The main body 100 is provided at sides thereof with mounting frames 120 having sizes w corresponding to widths w of battery cells 10 and 11 so that the battery cells 10 and 11 can be uprightly mounted in the mounting frames 120 in a state in which electrode terminals 15 of the battery cells 10 and 11, which are plate-shaped secondary batteries, are exposed upward.

The die 200 is disposed at the lower end of the main body 100. The die 200 includes a rotary motor (not shown) connected to the rotary rod 110 to rotate the rotary rod 110.

Although the die 200 is rotated by the rotary motor as described above, the die 200 may be manually rotated.

The support members 300 are fixed to the die 200 to support the mounting frames 120 of the main body 100 and the battery cells 10 and 11 mounted in the mounting frames 120. The support members 300 are configured such that the upper end of a battery cell case of each battery cell is spaced apart from the upper end of each mounting frame 120 by a height h in a state in which the battery cells 10 and 11 are mounted in the mounting frames 120. In any case, the height h may be zero (0) so that the upper end of the battery cell case of each battery cell is consistent with the upper end of each mounting frame 120.

Meanwhile, serial numbers marked on the battery cells 10 and 11 and on the main body 100 are based on the specifications of the battery cells. The battery cells 10 and 11 are mounted in the respective mounting frames 120 so that the serial numbers marked on the battery cells 10 and 11 correspond to the serial numbers marked on the mounting frames 120.

The mounting frames 120 and the support members 300 are formed at four sides of the main body 100 so that the mounting frames 120 and the support members 300 have different sizes at the four sides of the main body 100. The width w of each of the mounting frames 120 is about 50% the width of the main body 100.

Also, the support members 300 are configured so as to be inserted into lower end openings of the respective mounting frames 120.

Figure 3:
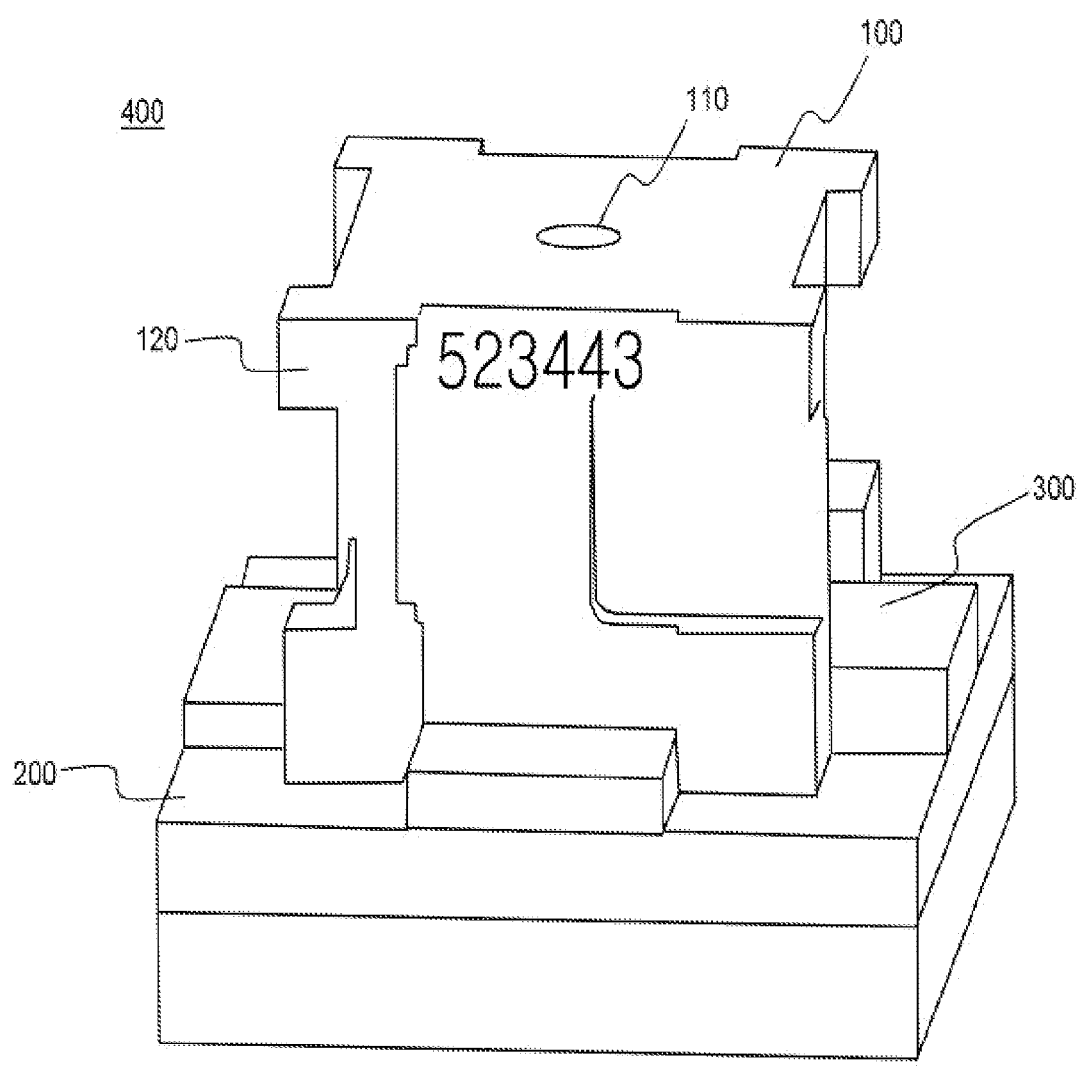
FIGS. 3 to 5 are typical views showing a process of rotating the rotary jig for battery cells.
Figure 4:
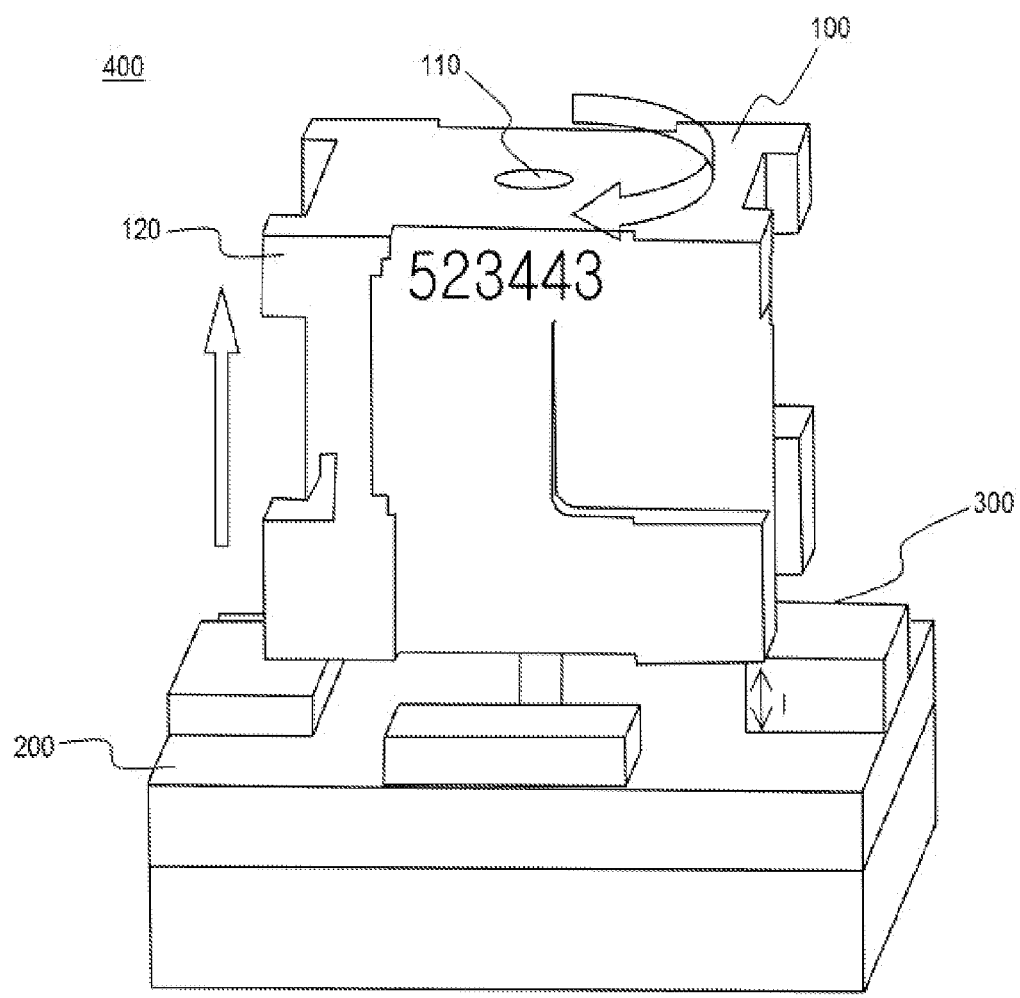
Figure 5:
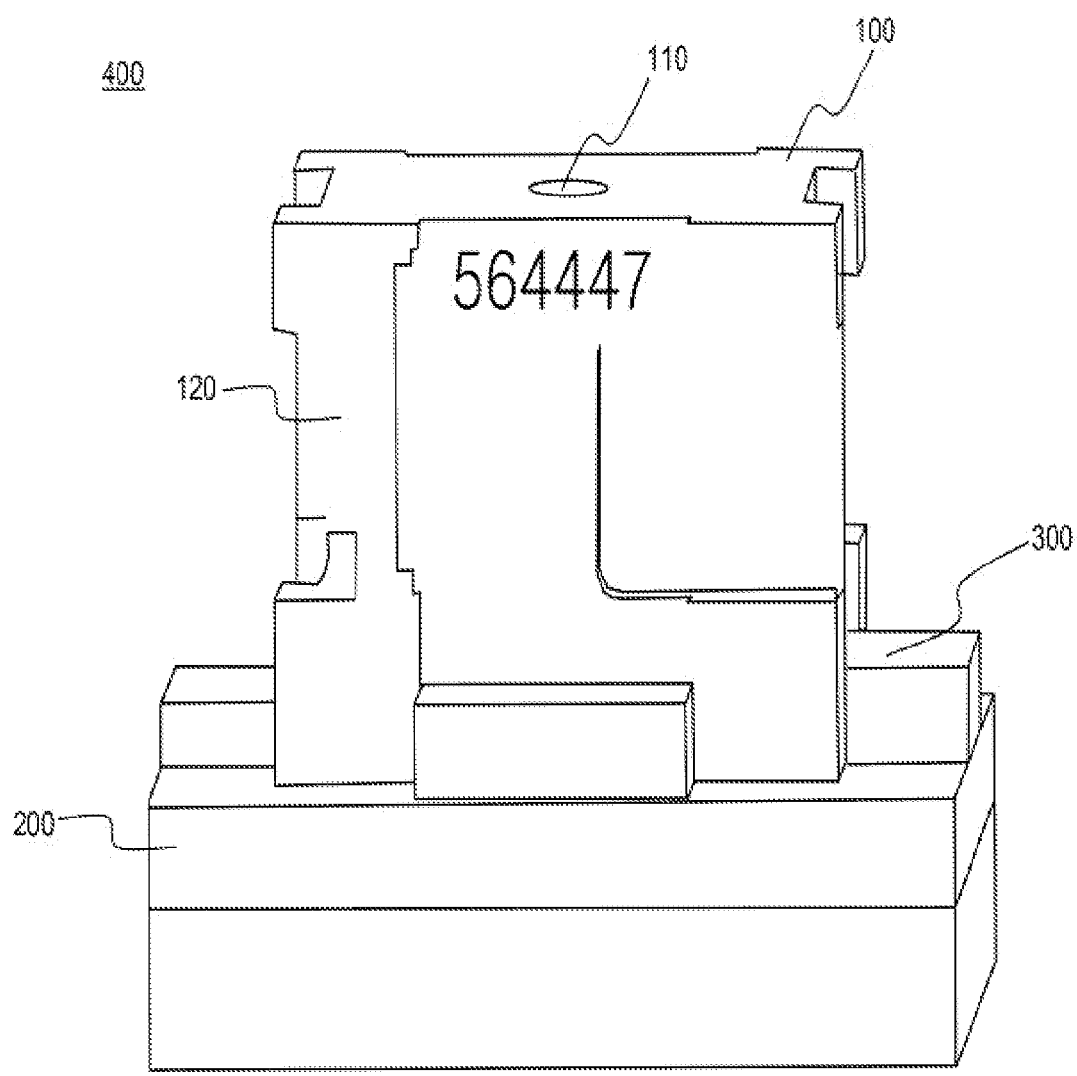

FIGS. 3 to 5 are typical views showing a process of rotating the rotary jig for battery cells.

Referring to these drawings together with FIGS. 1 and 2, the battery cells 10 and 11 are mounted to the corresponding sides of the main body 100, and resistance welding is performed with respect to a portion of the battery cell 10 to be welded from above the battery cell 10 using a welding rod 20.

Subsequently, the main body 100 is moved upward above a height 1 of a corresponding one of the supporting members 300, is rotated by 90 degrees, and is then moved downward by the rotary rod 110. In this state, resistance welding is performed. The above welding and rotation processes are repeated to sequentially perform welding with respect to the battery cells 10 and 11 mounted to the respective sides of the main body 100. These processes may be continuously performed automatically, semi-automatically, or manually.

The welded portion may be changed as needed. For example, a metal clad, a nickel plate, and a positive temperature coefficient (PTC) element may be electrically connected to the top of a corresponding one of the battery cells using resistance welding. Also, various welding methods may be used. For example, laser welding may be used in addition to the above resistance welding.

Using the rotary jig 400 for battery cells, therefore, it is possible to manufacture battery cells 10 and 11 having different sizes on a single assembly line, thereby improving manufacturing efficiency and productivity of a battery pack.

Specifically, a method of electrically connecting upper parts of battery cells 10 and 11 using a rotary jig 400 for battery cells in succession includes (a) a step of mounting the battery cells 10 and 11 in mounting frames 120 of a main body 100, (b) a step of performing resistance welding with respect to a portion of one of the battery cells to be welded at one side of the main body 100, (c) a step of moving the main body 100 upward above a corresponding one of the supporting members 300, rotating the main body 100 by 90 degrees, moving the main body 100 downward using the rotary rod 110, and fixing the main body 100, and (d) a process of repeating step (b) and step (c).

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A rotary jig for battery cells to successively manufacture battery cells having different sizes, comprising:
    a main body configured to have a hexahedral structure having a rotary rod mounted at a lower end thereof, the main body being provided at sides thereof with mounting frames having sizes corresponding to sizes of battery cells so that the battery cells can be uprightly mounted in the mounting frames in a state in which electrode terminals of the battery cells are exposed upward;
    a die disposed at a lower end of the main body, the die connected to the rotary rod so that the die can be rotated manually or by a rotary motor; and
    support members formed at the die to support the mounting frames of the main body and the battery cells mounted in the mounting frames, wherein
    the rotary rod is rotated so that resistance welding is performed with respect to a portion of one of battery cells to be welded using a welding rod located above the battery cell in a state in which the battery cells are mounted to the corresponding sides of the main body.

2. The rotary jig for battery cells according to claim 1, wherein the mounting frames and the support members have different sizes at four sides of the main body.

3. The rotary jig for battery cells according to claim 1, wherein the mounting frames have sizes corresponding to widths of the battery cells, and the support members are configured such that an upper end of a battery cell case of each of the battery cells is spaced apart from an upper end of each of the mounting frames by a predetermined height in a state in which the battery cells are mounted in the respective mounting frames.

4. The rotary jig for battery cells according to claim 3, wherein each of the mounting frames has a size corresponding to 30% to 50% a width of the main body.

5. The rotary jig for battery cells according to claim 1, wherein, the support members are configured so as to be inserted into lower end openings of the respective mounting frames.

6. The rotary jig for battery cells according to claim 1, wherein the rotary rod is moved upward above a height of a corresponding one of the supporting members and is then rotated by 90 degrees for successive welding.

7. The rotary jig for battery cells according to claim 1, wherein the rotary rod is moved automatically, semi-automatically, or manually for successive welding.

8. The rotary jig for battery cells according to claim 1, wherein the welded portion is one selected from among a metal clad, a nickel plate, and a positive temperature coefficient (PTC) element electrically connected to a top of a corresponding one of the battery cells using resistance welding.

9. The rotary jig for battery cells according to claim 1, wherein the battery cells are plate-shaped secondary batteries.

10. A welding method of electrically connecting upper parts of battery cells using a rotary jig for battery cells in succession comprising:
    (a) mounting the battery cells in mounting frames of a main body;
    (b) a step of performing resistance welding with respect to a portion of one of the battery cells to be welded at one side of the main body;
    (c) moving the main body upward above a corresponding one of the supporting members, rotating the main body by 90 degrees, moving the main body downward using the rotary rod, and fixing the main body; and
    (d) repeating step (b) and step (c).

* * * * *